3,576,654
CERAMICALLY BONDED DOLOMITE BRICK
George F. Carini and Ben Davies, Pittsburgh, Pa., assignors to Dresser Industries, Inc., Dallas, Tex.
No Drawing. Filed Sept. 10, 1969, Ser. No. 856,848
Int. Cl. C04b 35/48
U.S. Cl. 106—57                                     5 Claims

ABSTRACT OF THE DISCLOSURE

A ceramically bonded basic refractory shape made from a batch consisting of a calcined dolomite-zircon grain and optionally additional zircon.

---

The problems involved in the manufacture of ceramically bonded brick from dead-burned dolomite grain are well known in the art. These problems practically all stem from the affinity that the lime in dead-burned dolomite has for moisture with concomitant disintegration due to the expansion caused by hydration. Repeated attempts have been made to inhibit this reaction so as to take advantage of the very high melting point and, thus, good refractoriness of dolomite. Most of these attempts have involved the use of various amounts of chemical additives, fluxes, or so-called dead burning agents, such as mill scale, iron oxide, silica, clay, etc., which additives, while inhibiting hydration of the lime in the dolomite, have substantially reduced the refractoriness thereof; and, in some instances, limited the possible areas of use because of high impurity content. This is particularly true when mill scale or iron oxide has been used. The patent literature is replete with disclosures of how to stabilize lime and high lime content material such as dolomite. However, the prior art has seemed to indicate that hydration resistance is usually obtained only by elimination of free lime by reacting with oxides at the cost or refractoriness.

In a patent of A. L. Renkey, No. 2,971,240, a new approach to this problem was advanced. In that application, dolomite and lime bodies were subjected to flash firing, i.e., the bodies were heated at such a rate as to reach 1000° F. within 5 minutes, and the deleterious hydration was avoided. It will be realized that there are certain practical difficulties present in the case of flash firing which are absent when the normal burning schedules are employed.

In accordance with another patent of B. Davies et al., No. 3,108,860, fired dolomite and lime refractory shapes are produced without flash firing or incorporating stabilizing additives in the batches used. This is accomplished by firing the shapes under conditions determined to minimize the amount of moisture that is in contact with the shapes during the significant period, i.e., until their temperature is on the order of at least 1000° F. Consequently, material hydration simply does not occur, and the resultant fired product is free from cracks and has a hydration resistance under normally moist atmospheric conditions to give it good commercial life. By material hydration it is meant that moisture is not added during the firing, as would occur in a non-sealed kiln or with a hydrogen-containing fuel. The moisture that is present in the atmosphere that would be in a firing chamber upon sealing is not material, for it would not be sufficient to cause cracks, much less to develop other forms of hydration damage.

Other workers have performed experiments with compositions consisting of dolomite and zircon to study the mineral constituents. The results of these studies indicated that materials usable as refractories were not expected to be obtained because in the range of 30–70 mole percent dolomite, softening or melting occurred, and in the range of greater than 90 mole percent dolomite, slaking occurred owing to free lime.

The above results were substantiated in arriving at the present invention. Brick were made with pan additions of 5, 10, 20 and 30% —200 mesh zircon and burned to cone 23. All brick were badly cracked in the burn, and the brick containing 30% zircon completely disintegrated. Distintegration was presumed to be due to the inversion of dicalcium silicate formed on firing by the reaction between silica in the zircon and lime in the dolomite, to the gamma ($\gamma$) form.

Accordingly, it is an object of the present invention to provide dimensionally stable, fired dolomite refractories.

Another object of the invention is to provide dolomite refractory shapes having relatively high, hot-temperature strength as measured by the modulus of rupture test.

In accordance with the present invention, there is provided refractory shapes made from a batch comprising grain containing at least 90%, by weight, dolomite and from 1–10%, by weight, zircon, which is zirconium silicate, and from 0–10% of zircon. The brick after firing at elevated temperatures are mineralogically characterized as periclase (MgO), lime (CaO), tricalcium silicate $$(3CaO \cdot SiO_2)$$

and calcium metazirconate ($CaO \cdot ZrO_2$).

It should be noted that the chemical content of fired brick can be arrived at in several ways. For example, similar chemical content can be obtained by using pre-formed grog made by dead burning or firing a mixture of dolomite and zircon as in the present invention. It can also be arrived at by adding a mixture of silica and zirconia to dolomite brick mixes. However, these latter manufacturing methods do not give brick with the properties or structure similar to the brick of the instant invention, even though the chemical content or analysis may be the same or similar, which will be demonstrated subsequently by way of example.

Prior to use, the shapes may be impregnated with carbonaceous material. For example, the shapes may be impregnated with graphite, coke from petroleum or coal, carbon black, tar or pitch or any combination of these.

The porosity of fired shapes, according to the invention is less than about 11%. The modulus of elasticity, E values $\times 10^{+6}$, is usually below about 20.

Shapes made according to this invention may take the form of brick, nozzles, nozzle inserts and the like.

A better understanding and other objects and advantages of fired basic refractory shapes, according to this invention, will become apparent to those skilled in the art from a study of the following detailed description.

The following examples are exemplary of the best mode now known for the practice of this invention; but I do not wish to be limited thereto but, rather, note that the true spirit and scope of the invention is as defined in the appended claims.

In the following discussion, all parts and percentages are by weight unless otherwise specified. All analyses are on the basis of an oxide analysis, in accordance with the conventional practices of reporting the chemical content of refractory materials. All size grading is according to the Tyler standard series of screens unless otherwise mentioned.

Previously it was stated that dolomite brick were made with various pan additions of zircon and that all of the brick either badly cracked or completely disintegrated. One sample of these brick, the one made with 5% zircon, was reheated at 3140° F., then crushed and sized to provide stable grain which was remade into brick and burned to cone 23. This is an approach to the present invention by the use of brick bats.

A mixture of 95% caustic dolomite and 5% zircon (400 mesh) was dry mixed in a cone blender. The mixture was formed into briquettes by passing through briqetting rolls. A briquetting process is disclosed in U.S. Pat. No. 3,298,840, assigned to the present assignees. The briquettes were burned or fired to 3050° F. and held for about 10 hours. The grain had a bulk specific gravity in excess of 3 grams per cubic centimeter. The briquettes were crushed and size graded so that about 85% was −6 +28 mesh and about 15% was −28 mesh. The size-graded grain was mixed with a temporary organic binder, pressed at 10,000 p.s.i. and burned at cone 23 (2810° F.). The shapes were tested for physical properties, and the results are shown in Table I below.

TABLE I

| Mix: | A |
|---|---|
| Dolomite—zircon grain, −4 mesh, percent | 65 |
| Dolomite—zircon grain, BMF, percent | 35 |
| Neutralized soya residue, percent | 3.5 |
| Bulk density [1], p.c.f. (Av. 11) | 190 |
| Modulus of rupture, p.s.i. (Av. 3): | |
| At room temperature [2] | 4550 |
| At 2700° F.[3] (hold time 5 hours) | 1280 |
| Apparent porosity (Av. 3), percent | 10.3 |
| Modulus of elasticity ($\times 10^6$ p.s.i.) (Av. 3) | 18.41 |
| Reheat 2910° F.[4] (Av. 3): | |
| Linear change, percent | −0.2 |
| Volume change, percent | −1.3 |

[1] ASTM C20-46.
[2] ASTM C133-55.
[3] ASTM C583-65T.
[4] ASTM C113-61.

Brick A have moderately high bulk density and cold and hot modulus of rupture, and relatively low porosity.

X-ray diffraction analysis showed lime and periclase to be the major components and tricalcium silicate and calcium metazirconate to be the minor components in the brick.

Petrographic examination of the brick showed tricalcium silicate and calcium metazirconate developed in the ground mass forming a ceramic bond. Small, closed pores were formed in the ground mass.

In another embodiment of the invention, the dolomite zircon grain is fabricated as described above. To this grain is added 5% zircon, and the mixture is formed into shapes in the same manner as above and is fired at cone 23.

Table II sets forth exemplary chemical analyses of the dolomite and zircon, which were used for the tests reported in Table I.

TABLE II

| | Dolomite, percent | Zircon, percent |
|---|---|---|
| $SiO_2$ | 0.5 | 34.0 |
| $Al_2O_3$ | 0.2 | 0.95 |
| $TiO_2$ | 0.02 | 0.2 |
| $Fe_2O_3$ | 0.2 | 0.03 |
| CaO | 58.1 | |
| MgO | 41.0 | |
| $ZrO_2$ | | 65.5 |

Having thus described the invention in detail and with sufficient particularity as to enable those skilled in the art to practice it, what is desired to have protected by Letters Patent is set forth in the following claims.

We claim:
1. A fired, volume stable, refractory shape having a relatively high hot temperature strength, made from a batch consisting essentially of a grain composed of at least 90%, by weight, dolomite, and from 1–10%, by weight, zircon, and from 0–10% zircon, said shape being petrographically characterized by an aggregate composed of periclase and lime bonded together by a matrix of tricalcium silicate and calcium metazirconate.

2. A refractory shape according to claim 1 which contains between about 1 and 5% zircon in the grain.

3. Refractory shape according to claim 1 which contains between about 1 and 5% zircon in the batch in addition to that contained by the grain.

4. A shape according to claim 1 which is impregnated with a carbonaceous material.

5. A method for making a fired refractory shape comprising fabricating a refractory batch mixture consisting essentially of a grain containing at least 90%, by weight, dolomite, and from 1–10%, by weight, zircon, forming the mixture into shapes, burning the shapes at elevated temperatures, crushing and size grading said burned shapes to provide a size graded mixture, adding from 0–10%, by weight, zircon, to the mixture, forming the resulting mixture into refractory shapes with the aid of a temporary binder, and firing said shapes to obtain an end product petrographically characterized by an aggregate composed of periclase and lime bonded together by a tricalcium silicate and calcium metazirconate matrix.

References Cited

UNITED STATES PATENTS

| 3,192,059 | 6/1965 | Good et al. | 106—57 |
| 3,303,032 | 2/1967 | Holt et al. | 106—57 |
| 3,457,092 | 7/1969 | Tervo | 106—57 |
| 3,520,706 | 7/1970 | Davies et al. | 106—57 |

JAMES E. POER, Primary Examiner

U.S. Cl. X.R.

106—58, 63